(12) United States Patent
Meshchaninov et al.

(10) Patent No.: US 11,850,642 B2
(45) Date of Patent: Dec. 26, 2023

(54) METHOD OF LOW-TEMPERATURE TREATMENT OF HOUSEHOLD WASTE

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

(*) Notice: Subject to any disclaimer, the term of this patent is extended or adjusted under 35 U.S.C. 154(b) by 0 days.

(21) Appl. No.: 18/221,313

(22) Filed: Jul. 12, 2023

(65) Prior Publication Data

US 2023/0356276 A1    Nov. 9, 2023

Related U.S. Application Data

(63) Continuation of application No. PCT/IB2022/060911, filed on Nov. 14, 2022.

(30) Foreign Application Priority Data

Dec. 30, 2021 (RU) .......................... RU2021140063

(51) Int. Cl.
*B09B 3/50* (2022.01)
*B09B 101/25* (2022.01)
*A61L 2/14* (2006.01)

(52) U.S. Cl.
CPC ............ *B09B 3/50* (2022.01); *B09B 2101/25* (2022.01)

(58) Field of Classification Search
None
See application file for complete search history.

(56) References Cited

U.S. PATENT DOCUMENTS 5,847,494 A * 12/1998 Bayliss ................... H01T 19/00
                                                    422/186.04
6,497,839 B1 * 12/2002 Hasegawa ................ A23B 9/06
                                                    422/186.03

(Continued)

FOREIGN PATENT DOCUMENTS

CN         1316615 A      10/2001
CN       103204467 A       7/2013

(Continued)

OTHER PUBLICATIONS

Document entitled JP2005288277A Waste Treatment Apparatus and Waste Treatment Method, English machine translation of JP2005288277A provided by Espacenet (Year: 2005).*

(Continued)

*Primary Examiner* — Holly Kipouros
(74) *Attorney, Agent, or Firm* — Bardmesser Law Group

(57) ABSTRACT

The invention relates to methods of household waste management, in particular, to methods of disposing waste by plasma-chemical destruction method. The invention is directed to attaining a technical effect of broadening range of technical solutions by providing a method of destruction of household waste at low temperature of treatment that is comparable to environment temperature. This technical effect is attained by a destruction method, where household waste is fed into a reactor via an input opening, and entry of atmospheric air into the reactor is restricted. The reactor is a closed cavity, whose inner surface is made conductive (Continued)

entirely or partially and is grounded. An electrode protrudes into the reactor, and this electrode is isolated from the grounded surface. High-voltage pulses are supplied to the electrode. The pulses cause formation of corona discharge streamers in a gap between the electrode and the conductive surface of the reactor.

13 Claims, 1 Drawing Sheet

(56) References Cited

U.S. PATENT DOCUMENTS

| | | | |
|---|---|---|---|
| 2003/0108460 A1* | 6/2003 | Andreev | B01D 53/32 |
| | | | 422/186.07 |
| 2005/0021102 A1 | 1/2005 | Ignagni et al. | |
| 2008/0159925 A1* | 7/2008 | Shimizu | A61L 2/10 |
| | | | 422/186.05 |
| 2008/0208280 A1 | 8/2008 | Lindenthaler et al. | |
| 2013/0318947 A1 | 12/2013 | Malik et al. | |
| 2014/0142652 A1 | 5/2014 | Francois et al. | |
| 2016/0067485 A1 | 3/2016 | Lindenthaler et al. | |
| 2020/0164207 A1 | 5/2020 | Meyyappan et al. | |
| 2021/0104906 A1 | 4/2021 | Wang et al. | |
| 2022/0362821 A1* | 11/2022 | Chiodini | C12M 45/04 |

FOREIGN PATENT DOCUMENTS

| | | |
|---|---|---|
| CN | 103368447 A | 10/2013 |
| CN | 205288095 U | 6/2016 |
| CN | 110995050 A | 4/2020 |
| EA | 012275 B1 | 8/2009 |
| ES | 2909949 A1 | 5/2022 |
| FR | 1237539 A | 7/1960 |
| GB | 516158 A | 12/1939 |
| JP | H08299747 A | 11/1996 |
| JP | 2005288277 A * | 10/2005 |
| KR | 20080050318 A | 6/2022 |
| KZ | 24850 A4 | 11/2011 |
| RU | 2116244 C1 | 7/1998 |
| RU | 2122519 C1 | 11/1998 |
| RU | 12220 U1 | 12/1999 |
| RU | 61705 U1 | 3/2007 |
| RU | 2326487 C2 | 6/2008 |
| RU | 2410835 C1 | 1/2011 |
| RU | 122466 U1 | 11/2012 |
| RU | 2592085 C1 | 7/2016 |
| RU | 2741004 C1 | 1/2021 |
| RU | 2753275 C1 | 8/2021 |
| UZ | 5108 B | 4/2002 |
| UZ | 4426 C | 10/2011 |
| WO | 2012/044875 A1 | 5/2012 |

OTHER PUBLICATIONS

The Engineering ToolBox (2004). Pressure. [online] Available at: https://www.engineeringtoolbox.com/pressure-d_587.html [Accessed Sep. 9, 2023]. (Year: 2004).*

Hrabovsky et al., Plasma Aided Gasification of Biomass and Plastics using CO2 as Oxidizer, International Symposium on Non-Thermal/Thermal Plasma Pollution Control Technology & Sustainable Energy, ISNTP 7, Jun. 21-25, 2010, St. John's, Newfoundland, Canada (Year: 2010).*

Search report in PCT/IB2022/060911, dated Feb. 28, 2023.

Ecotechnics, Equipment for cleaning processes for industrial gases and liquids: A study guide / D.E. Smirnov (et al.); gen. ed. by L.V. Chekalov, A.V. Sugak.—Yaroslavl: YaGTU publ., 2013.—180 pages. ISBN 978-5-9914-0351-1.

Aristova N.A., Piskarev I.M., Ivanovskiy A.V., Selemir V.D., Spirov G.M., Shlepkin S.I., Initiation of chemical reactions by electrical discharge in dielectric-gas-liquid configuration // Physical Chemistry Journal, 2004, vol. 78, #7, pp. 1326-1331.

Piskarev I.M., Oxidation-reduction processes in water initiated by electrical discharge above water surface // General Chemistry Journal, 2001, vol. 71, Issue 10, p. 1622.

Search report in PCT/IB2022/058934, dated Dec. 15, 2022.
Search report in PCT/IB2022/058935, dated Dec. 22, 2022.
Search report in PCT/IB2022/058937, dated Dec. 15, 2022.
Search report in PCT/IB2022/060872, dated Mar. 2, 2023.
Search report in PCT/IB2022/060909, dated Mar. 2, 2023.

Rybka D. V. et al., Koronnyi razryad v vozdukhe atmosfernogo davleniya pri modul'nnom impul'se napryazheniya dlitel'nosti 10 ms (Coronal discharge in air of atmospheric pressure with modular voltage impulse of duration 10 ms), Optika atmosfery i okeana (Optics of atmosphere and ocean), 26, No. 1, 2013.

* cited by examiner

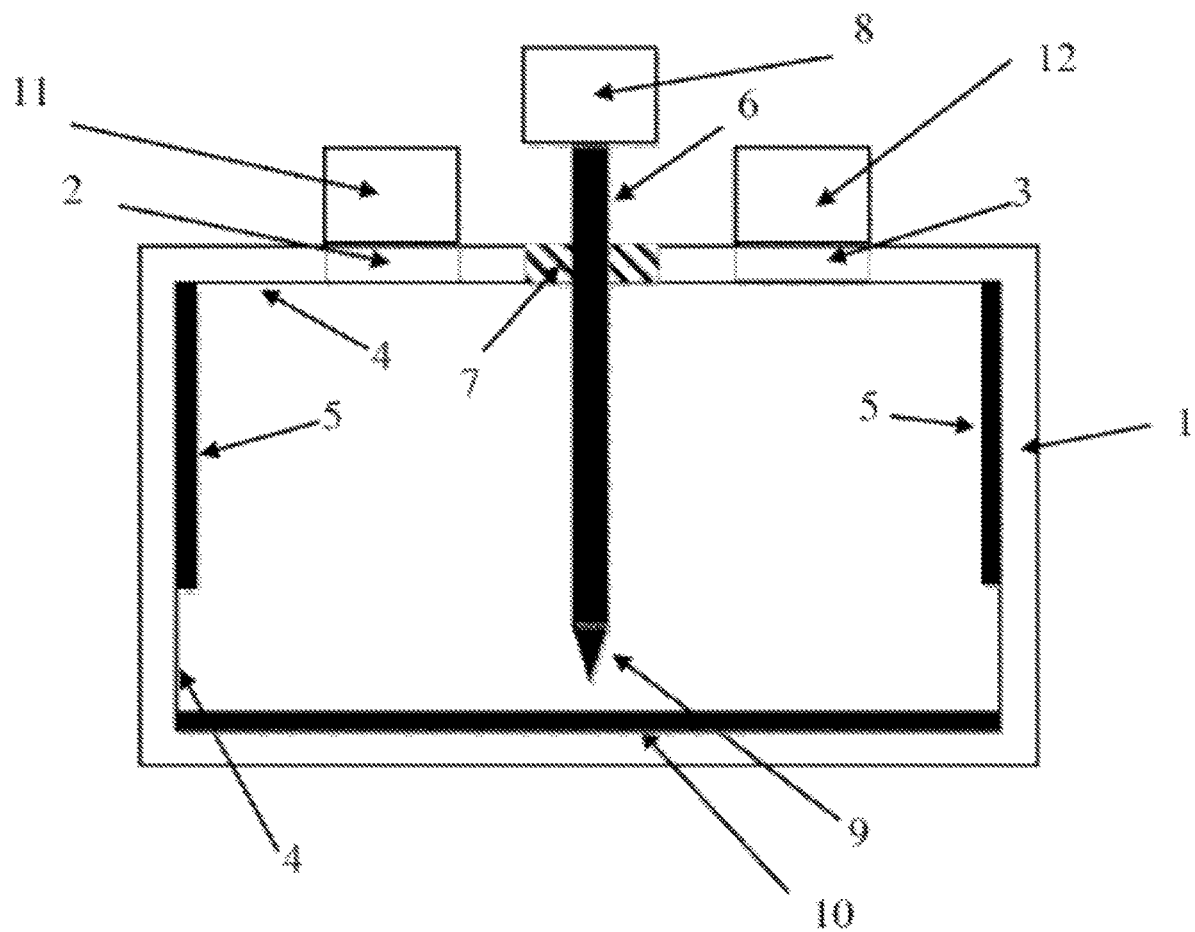

METHOD OF LOW-TEMPERATURE TREATMENT OF HOUSEHOLD WASTE

FIELD OF INVENTION

The invention relates to methods of household waste management, in particular, to methods of disposing waste by plasma-chemical destruction method.

PRIOR ART

There is a known method of solid organic waste treatment implemented in a device of patent RU2741004 (published on Jan. 22, 2021), where solid organic waste is treated by vapor plasma gasification conversion with generation of syngas. The treatment is performed by a high-temperature plasma reactor, where water vapor is used as a plasma-supporting gas and temperature of reaction area is about 1600 to 2000° C.

Disadvantages of this method are necessity of substantial heating for its carrying out and incomplete treatment of solid organic household waste, since the treatment results in syngas that also needs to be disposed. Moreover, non-organic substances contained in household waste cannot be treated this way.

SUMMARY OF INVENTION

The invention is directed to attaining a technical effect of broadening range of technical solutions by providing a method of destruction of household waste at low temperature of treatment that is comparable to environment temperature.

This technical effect is attained by a destruction method, where household waste is fed into a reactor via an input opening, and entry of atmospheric air into the reactor is restricted. The reactor is provided in form of a closed cavity, which inner surface is made conductive entirely or partially and grounded. An electrode protrudes into the reactor, and this electrode is isolated from the grounded surface. High-voltage pulses are supplied to the electrode. The pulses cause formation of corona discharge streamers in a gap between the electrode and the conductive surface of the reactor.

According to document [1], a large number of streamers are formed near the electrode tip at each pulse. The streamers start multiplying and spreading towards the grounded conductive surface of the reactor cavity, gradually populating the inter-electrode gap and forming corona discharge. Plasma of corona discharge streamers exerts an effect on water contained in the loaded waste, thus causing formation of free radicals due to disintegration of water molecules $H_2O \rightarrow OH \cdot + H \cdot$. In addition, other active substances are formed in the reactor due to corona discharge: $O_3$, $O_2(a^1\Delta)$, $H_2O_2$, OH, $O(^3P)$, NO, $HNO_2$ and $HNO_3$. Corona discharge also causes ultraviolet (UV) radiation. The above-mentioned active substances and UV radiation destroy any organic and inorganic substances contained in the household waste, thus providing complete destruction thereof and formation of harmless gaseous reaction products, namely, water and carbon dioxide. Non-organic contents of the household waste are destroyed by acids. Process of oxidation of organic substances in water is a chain reaction [2]. Low-rate chain reaction may be initiated by atmospheric oxygen and ozone. High-rate chain reaction is initiated by OH· radicals. In other words, plasma-chemical destruction of both organic and inorganic substances contained in the waste is provided by this method.

In one embodiment of the method, the conductive portion of the reactor cavity inner surface is covered by a layer of a water-containing liquid in advance, which facilitates formation of active particles inside the reactor. Preferably, size of the gap between the electrode and at least one of conductive portions of the reactor cavity inner surface or surface of the water-containing liquid covering this portion is provided in range of 5 to 50 millimeters. Preferably, the household waste is fed into the reactor in dosed amounts.

Preferably, the household waste doses are fed into the reactor in compressed form and entry of atmospheric air into the reactor is restricted. Preferably, pressure inside the reactor is decreased by 0.1 to 1.0 Pa compared to atmospheric pressure. In one embodiment of the method, depression is provided at the reactor output to decrease pressure inside the reactor.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 shows a vertical cross-section of the reactor for implementation of the claimed method.

DETAILED DESCRIPTION OF EMBODIMENTS OF THE INVENTION

Reference will now be made in detail to the preferred embodiments of the present invention, examples of which are illustrated in the accompanying drawings.

FIG. 1 shows a vertical cross-section of the reactor for implementation of the claimed method, where the following designators are used:

1—reactor body with inner cavity;
2—input opening;
3—output opening;
4—inner surface of reactor cavity;
5—conductive portions of inner surface of reactor cavity;
6—tipped electrode;
7—isolating members;
8—source of high-voltage pulses;
9—electrode tip;
10—conductive bottom of reactor;
11—device for dosed loading waste to be treated;
12—electrostatic filter with extraction air fan providing depression at reactor output.

The method is implemented by use of the reactor provided in form of the closed body (1) with the conductive bottom (10) that is grounded. The electrode (6) having the tip (9) protrudes into the body (1). The tip (9) is isolated from the conductive bottom (10) of the body (1) and directed towards it. A portion of compressed waste is fed from the device (11) for feeding waste to be treated in doses via the input opening (2) of the body (1), while entry of atmospheric air into the body (1) is restricted. High-voltage pulses are supplied to the electrode (6) from the source (8). As it is known from document [1], large number of streamers occur near the tip (9) of the electrode (6) with each pulse. The streamers start multiplying and spreading towards the conductive bottom (10) of the body (1), gradually populating the inter-electrode gap and forming streamer corona discharge. Plasma of corona discharge exerts an effect on water contained in the loaded waste and causes formation of free radicals upon destruction of water molecules: $H_2O \rightarrow OH\cdot + H\cdot$. In addition, other active substances are formed in the reactor due to corona discharge: $O_3$, $O_2(a^1\Delta)$, $H_2O_2$, OH, $O(^3P)$, NO, $HNO_2$ and $HNO_3$. Corona discharge also causes ultraviolet (UV) radiation. Almost entire energy of electrons in plasma is spent for formation of the indicated active particles by dissociation, activation of electron states and creation of rotation and oscillation levels of gas resided in the reactor, where streamer corona discharge is formed, so no substantial gas heating occurs. The above-mentioned active substances and UV radiation destroy any organic and inorganic substances contained in the waste to be treated, thus providing complete destruction thereof and formation of harmless gaseous reaction products, namely, water and carbon dioxide. Non-organic contents of the waste are destroyed by acids.

The process of oxidation of organic substances in water is a chain reaction [2]. A low-rate chain reaction may be initiated by atmospheric oxygen and ozone. A high-rate chain reaction is initiated by OH· radicals. In other words, plasma-chemical destruction of both organic and inorganic substances contained in the waste is provided in the device. Temperature of the body (1) and gases leaving it via the output opening (3) is near the environment temperature. In fact, entire energy of electric pulses is spent for formation of the active particles, which substantially accelerate natural reactions of oxidation of household waste. Gaseous products of destruction enter the output opening (3) of the reactor.

Thus, the specified technical effect is attained in form of providing the method of plasma-chemical destruction of both organic and non-organic substances contained in household waste at a temperature near the environment temperature.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

LIST OF REFERENCES

[1] Aristova N. A., Piskarev I. M., Ivanovskiy A. V., Selemir V. D., Spirov G. M., Shlepkin S. I., Initiation of chemical reactions by electrical discharge in dielectric-gas-liquid configuration // Physical Chemistry Journal, 2004, Vol. 78, #7, pages 1326-1331.

[2] Piskarev I. M., Oxidation-reduction processes in water initiated by electrical discharge above water surface // General Chemistry Journal, 2001, Vol. 71, Issue 10, page 1622.

What is claimed is:

1. A method of low-temperature destruction of organic and inorganic household waste, comprising:
    feeding the organic and inorganic household waste into a reactor via an input opening,
    wherein entry of atmospheric air into the reactor is restricted,
    wherein the reactor is shaped as a closed cavity, whose inner surface is made conductive entirely or partially and is grounded, and an electrode protrudes into the reactor such that the electrode is isolated from the inner surface; and
    supplying high-voltage pulses to the electrode, wherein the pulses cause formation of corona discharge streamers in a gap between the electrode and the conductive portion of the inner surface of the reactor, thereby destroying the organic and inorganic household waste through acceleration of oxidation reactions in the organic and inorganic household waste and plasma-chemical destruction of the organic and inorganic household waste, so as to convert the organic and inorganic household waste into gaseous reaction products.

2. The method of claim 1, wherein the conductive portion of the inner surface is covered by a layer of a water-containing liquid in advance of the feeding step.

3. The method of claim 2, wherein a size of a gap between the electrode and a surface of the water-containing liquid is 5 to 50 millimeters.

4. The method of claim 2, wherein a size of a gap between the electrode and the conductive portion of the inner surface is 5 to 50 millimeters.

5. The method of claim 1, wherein the household waste is fed into the reactor in dosed amounts.

6. The method of claim 5, wherein the household waste is packed into a compressed form prior to the feeding step.

7. The method of claim 1, wherein pressure inside the reactor is 0.1 to 1.0 Pa less than atmospheric pressure.

8. The method of claim 1, wherein an exhaust pump is provided at a reactor output.

9. The method of claim 1, wherein the destroying of the organic and inorganic household waste includes a chain reaction initiated by OH radicals.

10. The method of claim 1, wherein the corona discharge streamers generate $O_3$, $O_2(a^1\Delta)$, $H_2O_2$, $O(^3P)$, NO, $HNO_2$ and $HNO_3$.

11. A method of low-temperature destruction of organic and inorganic household waste, comprising:
    feeding the organic and inorganic household waste into a reactor via an input opening,
    wherein entry of atmospheric air into the reactor is restricted,
    wherein the reactor is shaped as a closed cavity, whose inner surface is made conductive entirely or partially and is grounded, and an electrode protrudes into the reactor such that the electrode is isolated from the inner surface; and
    supplying high-voltage pulses to the electrode, wherein the pulses cause formation of corona discharge streamers in a gap between the electrode and the conductive portion of the inner surface of the reactor, thereby forming free radicals OH·+H· due to disintegration of water molecules in the organic household waste, and destroying the organic and inorganic household waste through acceleration of oxidation reactions.

12. The method of claim 11, wherein the corona discharge streamers also generate $O_3$, $O_2(a^1\Delta)$, $H_2O_2$, $O(^3P)$, NO, $HNO_2$ and $HNO_3$.

13. The method of claim 11, wherein the conductive portion of the inner surface is covered by a layer of a water-containing liquid in advance of the feeding step.

* * * * *